Sept. 28, 1965   R. G. DAVIS   3,208,609
MOBILE POWER SHOVEL
Filed Oct. 28, 1963   2 Sheets-Sheet 1
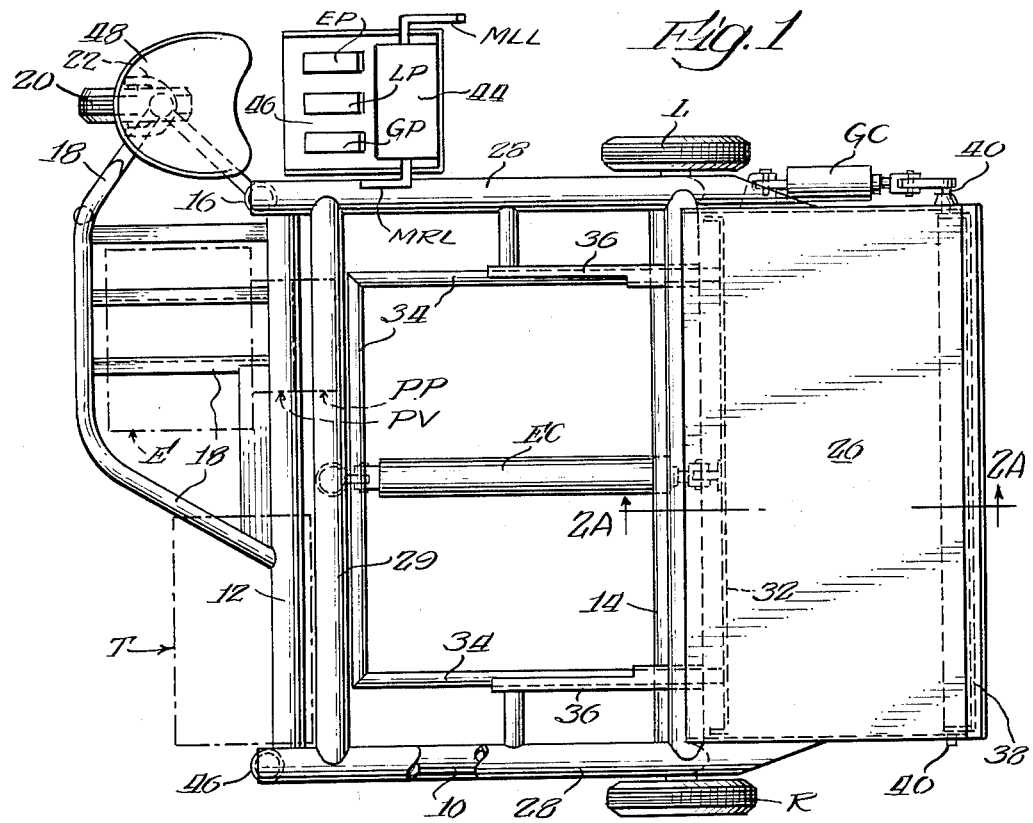
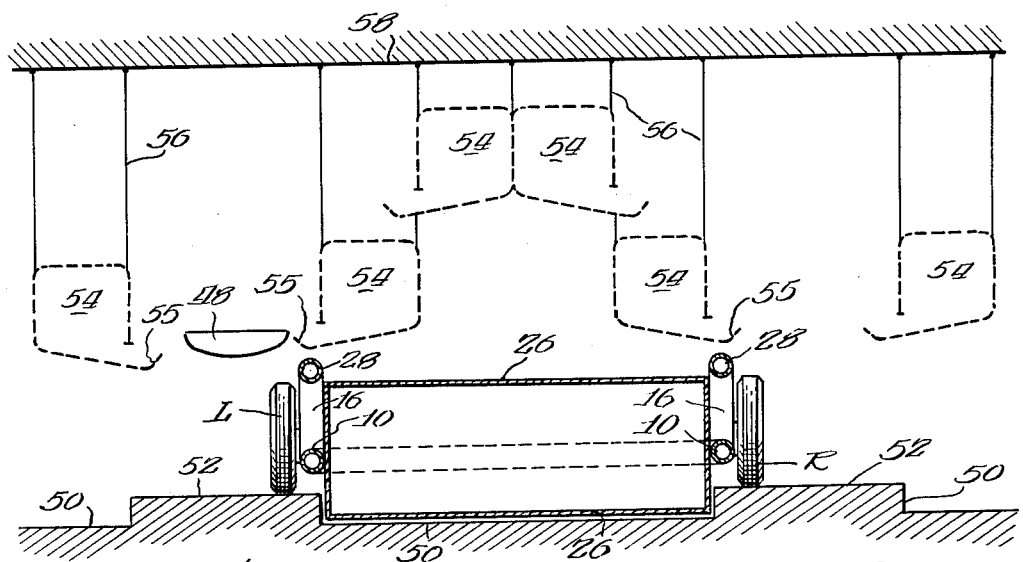
Inventor
Robert G. Davis
By Bair, Freeman & Molinare Attys.

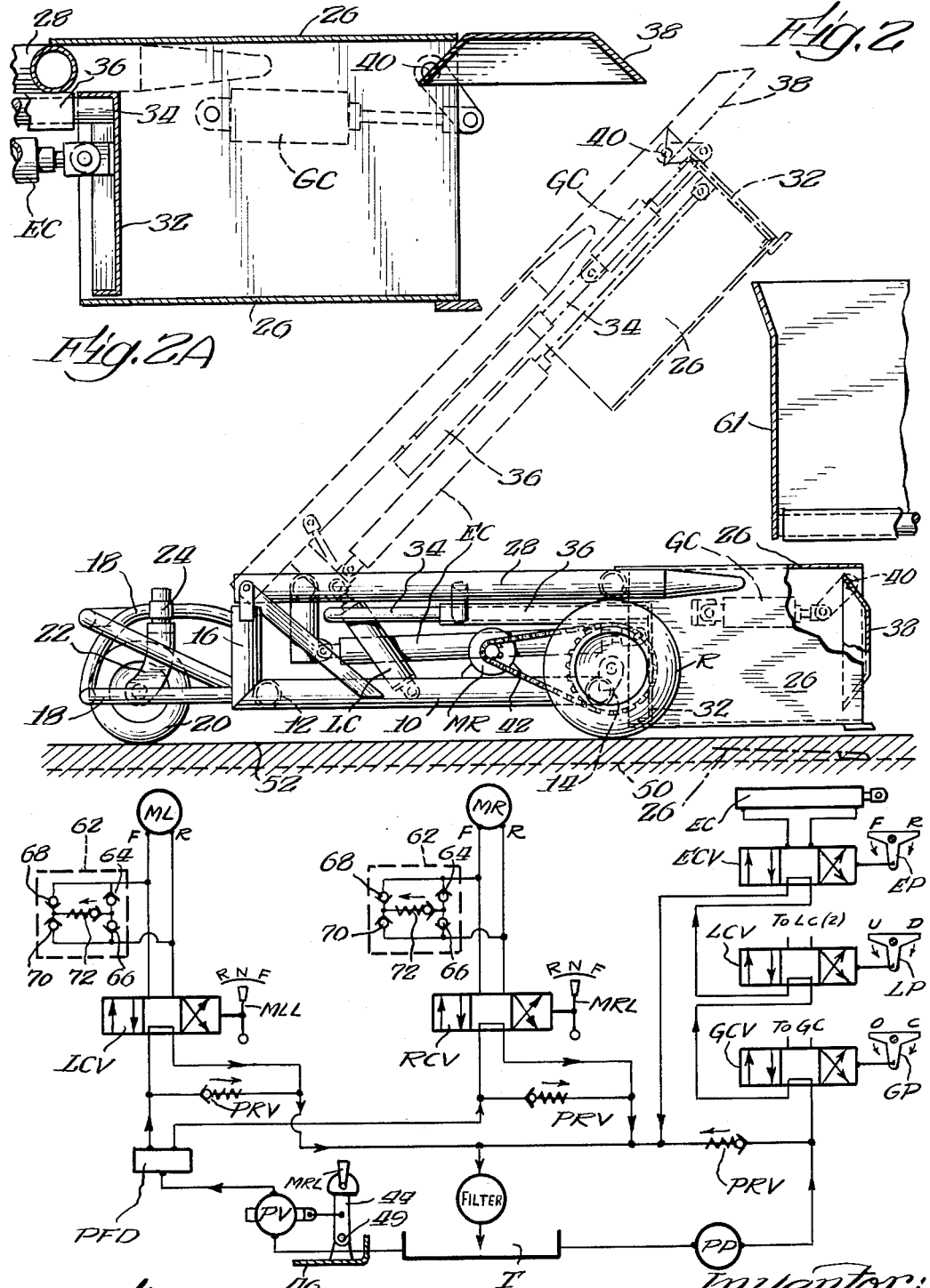

United States Patent Office 3,208,609
Patented Sept. 28, 1965

3,208,609
MOBILE POWER SHOVEL
Robert G. Davis, 526 E. 9th St., Gibson City, Ill.
Filed Oct. 28, 1963, Ser. No. 319,255
3 Claims. (Cl. 214—131)

This invention relates to a moble power shovel particularly designed for chicken house cleaning purposes.

One object of the invention is to provide a mobile power shovel which has a frame and a tube-like shovel supported thereon, the two being of low height so that they can operate under the cages of a chicken house, a driver's seat being provided at one side of the frame and adapted to occupy a runway of the chicken house during the cleaning operation being performed by the shovel of the machine while traveling in a droppings trough.

Another object is to provide a mobile power shovel which is readily manipulated for travel in either a forward or reverse direction and for turn-around within substantially its own outline whereupon the shovel may be lifted to an elevated position and its contents ejected into a manure spreader or the like.

Still another object is to provide a mobile power shovel which has a frame, and a shovel provided with lifting arms which are pivotally mounted on the frame, the shovel being located at the forward end of the frame and power means for operating the shovel being located at the rear end thereof, the frame being transported on right and left-hand main wheels and a caster wheel, the right and left-hand wheels being located adjacent the center of gravity of the frame and shovel when the shovel is loaded, the caster wheel being mounted at the rear end of the frame and to one side thereof, and a driver's seat being located adjacent the caster wheel so that one of the main wheels and the caster wheel can travel one runway of a chicken house and the other main wheel can travel another runway thereof with the shovel operable to scoop droppings from a droppings trough between the runways.

A further object is to provide the shovel with an ejector wall normally located at the back thereof and movable to the front thereof for ejecting the contents of the shovel, and to provide a gate for the front end of the shovel pivotally mounted at the top thereof which can be closed to help retain the shovel full of droppings once it is filled and until it can be transported to the manure loader for dumping of its contents thereinto.

Still a further object is to provide hydraulic means in the form of a reversible motor for each of the right and left-hand wheels, and suitable controls therefor located adjacent the driver's seat.

An additional object is to provide safety valve blocks for the motors which eliminate the possibility of burst hydraulic hoses under certain circumstances.

Another additional object is to provide hydraulic actuators for lifting the shovel and for the ejector and the gate, together with suitable controls therefor in the form of foot pedals also located adjacent the driver's seat.

With these and other objects in view, my invention consists in the construction, arrangement and combination of the various parts of my mobile power shovel, whereby the objects above contemplated are attained, as hereinafter more fully set forth, pointed out in my claims and illustrated in detail on the accompanying drawings, wherein:

FIG. 1 is a plan view of a mobile power shovel embodying my invention;

FIG. 2 is a side elevation thereof showing the shovel in lowered position, and by dash lines in an elevated position;

FIG. 2A is a sectional view through the shovel on line 2A—2A of FIG. 1;

FIG. 3 is a semi-diagrammatic view of a chicken house of the kind for which my shovel loader is particularly designed, showing in transverse cross-section the loading shovel in relation to runways and a droppings trough of the chicken house, and FIG. 4 is a hydraulic diagram of the actuating elements and their control valves used in my mobile power shovel.

On the accompanying drawings I have used the reference numerals 10, 12 and 14 to indicate the two sides, the back and the front members of a main frame welded up from steel tubing or the like. A pair of uprights 16 are provided adjacent the rear end of the main frame. There is also an auxiliary frame 18 welded to the rear of the main frame and extending to the left thereof as shown in FIG. 1.

The main frame 10–12–14 is wheel-mounted by means of right and left wheels R and L, and a third wheel is provided in the form of a caster wheel 20 having its mounting yoke 22 swivelly received in a boss 24 of the auxiliary frame 18 for free rotation about a vertical axis.

A shovel 26 is provided in the form of a rectangular tube formed of sheet steel (the tubular shape being shown in FIG. 3) and it is open at both the front and the back. lifting arms 28 are welded to the vertical sides of the tube and extend rearwardly to pivot at 30 to the uprights 16. The arrangement is such that the shovel 26 is immediately in front of the main frame 10–12–14, thus tending to counterbalance (when loaded) the weight of the main frame, the auxiliary frame and the apparatus supported thereby which will be later described. The wheels R and L are thus adjacent the center of gravity of the frame and shovel under a loaded condition of the shovel but there is sufficient weight back of the axis of the wheels R and L to prevent any possibility of the shovel tipping forward during the maneuvering thereof when occupied by the operator during such maneuvering.

Within the shovel 26 and spanning the width thereof is an ejector wall 32 carried by a U-frame 34 slidable in a pair of tubular guides 36. The shovel 26 is also provided with a gate 38 at its front end pivoted at 40.

Hydraulic means are provided for rotating the wheels R and L and for actuating the lifting arms 28, the ejector wall 32 and the gate 38. These comprise hydraulic motors MR and ML for the wheels R and L, an ejector cylinder EC for the ejector wall 32, a gate cylinder GC for the gate 38 and a pair of lifting cylinders LC for the shovel lifting arms 28. The motors ML and MR are of the reversible type and suitably connected as by chain drives 42 to the wheel L and R, respectively. The cylinders EC, GC and LC are double-acting hydraulic actuators of the cylinder-and-piston type and suitably connected to the ejector wall, gate and lifting arms as illustrated in FIGS. 1 and 2.

Referring to FIG. 4, the motors ML and MR are illustrated, together with a left wheel control valve LCV for the motor ML and a right wheel control valve RCV for the motor MR. An ejector control valve ECV is shown for the ejector cylinder EC and similar control valves LCV and GCV are provided for the lifting cylinders LC and the gate cylinder GC which are not illustrated in this figure since they would be similar to the cylinder EC and connected to their respective control valves in a similar manner. All five control valves are spring-centered.

A tank T is shown from which hydraulic fluid is pumped by a variable capacity pump PV to the motors ML and MR, first passing through a positive flow divider PFD to insure equal flow to the motors ML and MR and therefore equal rotation in the same direction of the wheels L and R when the control valves LCV and RCV are both adjusted forward or reverse. A positive displacement pump PP is shown for supplying hydraulic fluid to the control valves ECV, LCV and GCV. Pressure regulator valves PRV are provided for limiting the operating pressures of the pumps PV and PP.

The control valve LCV is provided with a left motor control lever MLL and the control valve RCV is provided with a right motor control lever MRL. These are shown in the neutral position (N), and the forward and reverse positions are indicated F and R, respectively.

An ejector pedal EP is provided for the valve ECV and can be tilted in one direction or the other against its centering spring bias for forward or rearward actuation of the ejector wall 32 as indicated F and R, respectively. Likewise the valves LCV and GCV are provided with foot pedals LP and GP, respectively, for operation up (U) or down (D) of the shovel, and open or close (O or C) for the gate 38 which is shown in the closed position by solid lines in FIG. 2 and in the open position in FIG. 2A. The ejector is shown in the rearward position in FIG. 2 by dotted lines and in the forward position when the shovel is raised by dot-and-dash lines while the shovel and lifting arms are shown in the lowered position by solid lines and in the raised or elevated position by dash lines.

Each of the pair of hydraulic lines leading to the motors ML and MR are provided with a safety valve block 62 having four check valves 64, 66, 68 and 70 and a pressure relief valve 72. The check valves 64 and 66 constitute a first pair of check valves opening toward each other and the check valves 68 and 70 constitute a second pair of check valves opening away from each other. It will be obvious that these check valves are shunted across the forward and reverse lines F and R of the motor. The pressure relief valve 72 is connected on its inlet side between the first pair of check valves and on its outlet side between the second pair so as to open toward the second pair. The purpose of the safety valve block 62 will hereinafter appear.

The levers MLL and MRL are mounted at the top of a pedestal 44 extending upwarding from a platform 46 located in front of a seat 48 for the operator. The pedestal is pivoted at its lower end to the platform 46 (see pivot 49 in FIG. 4) and operatively connected to the pump PV so as to vary its capacity by a fore-and-aft oscillation about the pivot. The seat 48 is located adjacent the caster wheel 20 as shown in FIGS. 1 and 2 which results in its location with respect to the shovel 26 being as illustrated in FIG. 3.

FIG. 3 also shows diagrammatically a cross-section through a chicken house wherein parallel troughs 50 for droppings are part of the floor structure. Between the troughs are raised runways 52.

This type of chicken house has cages 54 which are formed of wire netting and are supported by suspension wires 56 from a roof or ceiling 58. The chickens live continuously in the cages 54 and are watered and fed therein, and it will be noted the cages are arranged so that the droppings through the wire mesh floors fall into the troughs 50. The cages are provided with sloping bottoms terminating in egg-receiving troughs, and the runways 52 are provided for the operator to walk through in gathering the eggs. The whole arrangement is compact with the bottoms of the lowermost cages little more than two feet above the troughs 50. Accordingly, the space in which to operate my mobile power shovel is rather limited. The shovel is shown in FIG. 3 in relation to the cages and it will be noted that the wheels R and L travel the runways 52. The operator of the shovel on the seat 48 is above a runway and travels between the egg troughs of two rows of cages.

Another problem in connection with chicken houses of this type is the limited space at the ends of the troughs 50 where the power shovel is operated to discharge its contents into a manure spreader or the like. The shovel is filled with droppings while traveling in a direction away from the spread. When filled the gate 38 is closed. Thereupon the shovel is backed up to a position adjacent the spreader and turned around in a limited space by rotating one of the wheels R and L forward and the other reverse. The machine can thus be turned around within substantially its own outline.

During the turn-around operation the shovel 26 can be elevated by operation of the lifting cylinders LC as to the dash line position shown in FIG. 2 in which position the forward end of the shovel is high enough to extend over the side 61 of the manure spreader. To discharge the contents of the shovel, the gate 38 is opened and the ejector wall 32 is operated to move from its rearward position to its forward position shown by dot-and-dash lines, thereby displacing the contents of the shovel 26 therefrom and into the spreader.

The operator can now manipulate the machine to turn it around again for scooping up another load of droppings and delivering it to the spreader. The chicken houses are sometimes made as long as 200 feet and it takes several trips to clean out one trough 50 depending, of course, on the quantity of droppings therein. With a shovel 26 about two feet deep, three feet long and six feet wide, about one ton of droppings can be collected at a time and I have found a machine of the disclosed type very efficient in a chicken house cleaning operation of the type described. It eliminates the necessity of providing equipment such as a conveyor or a drag scoop for cleaning out the troughs 50. Where conveyors are used they soon rust out because of the acid in the droppings inasmuch as the conveyor, of course, is present 100 percent of the time. On the other hand, the operation of drag scoops is both complicated and awkward. Compared to these prior art devices my power shovel is a complete mobile unit that can be used by an operator to service a great number of chicken houses in a minimum amount of time and in an inexpensive manner.

The safety valve block 62 is provided to prevent the possibility of burst hydraulic lines and hoses under certain circumstances. If my mobile shovel is traveling on the level or uphill there is no operation of the safety valve block. If it goes over the top of the hill and travels downhill, however, the hydraulic motors for the wheels R and L act as hydraulic pumps and if the hill is steep enough can pump oil into the lines R at a pressure high enough to burst the lines or hoses and therefore the pressure relief valve 72 is provided set at, for instance, 4,500 p.s.i. when the pressure relief valves PRV are set for 3,500 p.s.i. Thus there can never be more than 4500 p.s.i. pressure in the lines and hoses at any time.

The operation of the valve block 62 consists of the oil pumped into the line R passing through the check valves 66 and 68 as permitted by the opening of the pressure relief valve 72. On the other hand, if the machine should travel backwards downhill, the high pressure in the line F would be transferred to the line R by passing through the check valves 64 and 70 as permitted by opening of the pressure relief valve 72. Thus the valve block operates in a protective capacity regardless of whether the high pressure is in the line R or the line F.

While I have described my mobile power shovel as particularly designed for chicken house cleaning purposes, obviously it can be used for any other loading operations desired and particularly for those where the shovel has to be advanced into an area that has low head room. As one example, it may be used by contractors for earth-removing operations under houses and the like.

Some changes may be made in the construction and arrangement of the parts of my power shovel without departing from the real spirit and purpose of my invention, and it is my intention to cover by my claims any modified forms of structure or use of mechanical equivalents which may reasonably be included within their scope.

I claim as my invention:

1. In a mobile shovel loader of the character disclosed, a frame, a shovel pivotally mounted thereon and projecting from the front end of said frame, power means for operating said loader, said power means being mounted on said frame adjacent the rear end thereof, right and left-hand wheels and a caster wheel for transporting said frame, individual, reversible hydraulic motors for rotating said right and left-hand wheels, said right and left-hand wheels being located adjacent the center of gravity of said frame and shovel when the shovel is loaded, said caster wheel being located adjacent the rear end of said frame and to one side thereof, a driver's seat adjacent said caster wheel, means for pivoting said shovel on said frame to thereby lift the shovel to an elevated position, means for ejecting the contents of said shovel therefrom, said last two means being hydraulically operated, said power means including hydraulic pump means for supplying fluid under pressure to said motors, shovel pivoting means and ejecting means, and individual controls adjacent said driver's seat for said hydraulic motors.

2. For use with a vehicle having right and left-hand wheels and a caster wheel for supporting said vehicle, a reversing hydraulic motor for each of said right and left-hand wheels, and hydraulic pump means for actuating said motors, a pivoted control column, a pair of control levers for said right and left-hand wheel motors pivotally mounted thereon for individual forward and reverse control of said motors, a portion of said hydraulic pump means being of the volume varying type, said column being connected thereto for changing the volume by pivoting the column.

3. For use with a vehicle such as claimed in claim 2 having a forward line and a reverse line to each motor; a safety valve block for each motor wherein a first pair of check valves open toward each other and a second pair of check valves open away from each other, said pairs of check valves being shunted across the forward and reverse lines to the motor, and a pressure relief valve connected on its inlet side between said first pair and on its outlet side between said second pair.

References Cited by the Examiner
UNITED STATES PATENTS

| | | | |
|---|---|---|---|
| 2,619,242 | 11/52 | Crampton et al. | 214—82 |
| 2,711,077 | 6/55 | Adams | 180—6.48 X |
| 2,774,434 | 12/56 | Ferris | 180—6.48 X |
| 2,818,126 | 12/57 | Vogeloar | 180—6.48 |
| 2,887,236 | 5/58 | Mindrum | 214—140 |
| 2,979,215 | 4/61 | Brisson | 214—510 X |
| 3,024,858 | 3/62 | Davis et al. | 180—6.48 |
| 3,121,502 | 2/64 | Schroeder | 214—131 |

HUGO O. SCHULZ, *Primary Examiner.*